(12) United States Patent
Chung et al.

(10) Patent No.: US 11,047,708 B2
(45) Date of Patent: Jun. 29, 2021

(54) METHOD OF ESTIMATING RELIABILITY OF MEASUREMENT DISTANCE OF LASER RANGEFINDER, AND LOCALIZATING METHOD OF MOBILE ROBOT USING LASER RANGEFINDER

(71) Applicant: Korea University Research and Business Foundation, Seoul (KR)

(72) Inventors: Woo-Jin Chung, Seoul (KR); Ji-Woong Kim, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 615 days.

(21) Appl. No.: 15/876,511

(22) Filed: Jan. 22, 2018

(65) Prior Publication Data
US 2018/0209815 A1 Jul. 26, 2018

(30) Foreign Application Priority Data
Jan. 24, 2017 (KR) .................. 10-2017-0010953

(51) Int. Cl.
| G01C 25/00 | (2006.01) |
| G01C 3/08 | (2006.01) |
| G01S 17/42 | (2006.01) |
| G05D 1/02 | (2020.01) |
| G01S 17/08 | (2006.01) |
| G05D 1/08 | (2006.01) |
| G01S 7/497 | (2006.01) |

(52) U.S. Cl.
CPC .............. G01C 25/00 (2013.01); G01C 3/08 (2013.01); G01S 7/497 (2013.01); G01S 17/08 (2013.01); G01S 17/42 (2013.01); G05D 1/0231 (2013.01); G05D 1/0891 (2013.01)

(58) Field of Classification Search
CPC ......... G01C 25/00; G01S 17/42; G01S 17/08; G01S 7/497; G05D 1/0231; B25J 19/022
See application file for complete search history.

(56) References Cited

U.S. PATENT DOCUMENTS

| 2009/0202174 A1* | 8/2009 | Shiba ................. G06K 9/46 382/282 |
| 2015/0127249 A1 | 5/2015 | Strauβ et al. |
| 2016/0011594 A1* | 1/2016 | Chung ................. G06K 9/6234 701/28 |
| 2017/0003380 A1* | 1/2017 | Chung ................. G01S 17/42 |

FOREIGN PATENT DOCUMENTS

| KR | 10-1436858 B1 | 9/2014 |
| KR | 10-2015-0005809 A | 1/2015 |

* cited by examiner

*Primary Examiner* — Regis J Betsch
*Assistant Examiner* — Jeremy A Delozier
(74) *Attorney, Agent, or Firm* — NSIP Law

(57) ABSTRACT

The present invention relates generally to a method of estimating reliability of a measurement distance of a laser rangefinder, and a localization method of a mobile robot using the laser rangefinder. More particularly, the present invention relates to a method of estimating reliability of a measurement distance of a laser rangefinder, and a localization method of a mobile robot using the laser rangefinder, the method being capable of estimating a distance type of a measurement distance measured by a laser rangefinder, and estimating reliability of the measurement distance to utilize the reliability in localization of a mobile robot.

12 Claims, 11 Drawing Sheets

METHOD OF ESTIMATING RELIABILITY OF MEASUREMENT DISTANCE OF LASER RANGEFINDER, AND LOCALIZATING METHOD OF MOBILE ROBOT USING LASER RANGEFINDER

CROSS REFERENCE TO RELATED APPLICATION

The present application claims priority to Korean Patent Application No. 10-2017-0010953, filed Jan. 24, 2017, the entire contents of which is incorporated herein for all purposes by this reference.

TECHNICAL FIELD

The present invention relates generally to a method of estimating reliability of a measurement distance of a laser rangefinder, and a localization method of a mobile robot using the laser rangefinder. More particularly, the present invention relates to a method of estimating reliability of a measurement distance of a laser rangefinder, and a localization method of a mobile robot using the laser rangefinder, the method being capable of estimating a distance type of a measurement distance measured by a laser rangefinder, and estimating reliability of the measurement distance to utilize the reliability in localization of a mobile robot.

BACKGROUND ART

A localization technology is a core technology for autonomous driving of mobile robots or autonomous cars, etc. (hereinafter, referred to as 'a mobile robot'). A mobile robot can establish an optimized path plan based on a reliable localization result such that driving can be safely controlled. Therefore, recently, localization technology has been widely studied.

Performance of the localization technology is greatly influenced by the characteristics of a sensor and driving environment. The mobile robot relies on a measurement value provided from the sensor and updates its pose based thereon. However, the measurement value of the sensor may be partially distorted or inaccurate depending on the characteristics of the environment. Therefore, for robust localization in various environment conditions, accurate determination of the measurement value of the sensor is important.

Laser rangefinders or LiDAR sensors (hereinafter, referred to as 'a laser rangefinder') are representative sensors used in localization of the mobile robot. The laser rangefinder has advantages of easily realizing an observation model due to providing intuitive information on surrounding environments, and having high accuracy and precision, wide observation range, robustness to illumination, etc. However, the performance of the laser rangefinder-based localization technology may be degraded by following factors:

obstruction of a visual field of the sensor by a dynamic obstacle;

position change of a static obstacle in changing environment; and presence of an object (e.g., glass or a mirror) that causes an optical unusual phenomenon.

Due to the above-described factors, a measurement value of the laser rangefinder is different from the geometry of the environment predicted from a grid map. As a result, when an existing scan matching technology is used, an inaccurate pose of the mobile robot may be obtained. Also, the above factors may occur simultaneously in a real environment Therefore, with only a localization technology to overcome individual situations, a localization performance in various environments not may be assured.

Thus, substantial research has studied the localization problem in various environmental conditions. A localization technique using a laser rangefinder in an environment having dynamic obstacles is one of the most frequently discussed issues.

In a thesis entitled "Markov localization for mobile robots in dynamic environments (J. Artif. Intell. Res., vol. 11, pp. 391-427, 1999.)" written by D. Fox, W. Burgard, and S. Thrun, a method of classifying a measurement distance for a dynamic obstacle as outliers to remove the outliers has been proposed. In the thesis, by using a distance filter, a measurement distance shorter than a distance predicted from a map is detected as the outlier.

In a thesis entitled "Towards Effective Localization in Dynamic Environments (Proc. IEEE Int. Conf. Intell. Robots Syst., 2016.)" written by D. Sun, F. GeiBer, and B. Nebel, a method of detecting change in the environment using the distance filter and updating a map has been proposed in addition to detecting of the outlier using the distance filter.

In a thesis entitled "Active Localization with Dynamic Obstacles (Proc. IEEE Int. Conf. Intell. Robots Syst., 2016.)" written by A. Q. Li, M. Xanthidis, J. M. O'Kane, and I. Rekleitis, an observation model that can reduce influence of a dynamic obstacle using a weight function has been proposed.

However, the proposed methods in the above theses are disadvantages in that problems caused by factors other than the influence of the dynamic obstacle are not mentioned.

In the meantime, various approaches for long-term localization in a changing environment have also been proposed. For example, in a thesis entitled "Localization in highly dynamic environments using dual-timescale NDT-MCL (Proc. IEEE Int. Conf. Robot Autom., 2014.)" written by R. Valencia, J. Saarinen, H. Andreasson, J. Vallv'e, J. Andrade-Cetto, and A. J. Lilienthal, a localization technology using dual-time scale approach is disclosed. The dual-time scale approach simultaneously uses a static map and a continuously updated short-term map for localization in a changing environment. Also, in a thesis entitled "Lifelong localization in changing environments (Int. J. Robot. Res., vol. 32, no. 14, pp. 1662-1678, 2013.)" written by G. D. Tipaldi, D. Meyer-Delius, and W. Burgard, a localization algorithm using a Rao-Blackwellized particle filter and a dynamic occupancy grid has been proposed. The map which is continuously updated according to the change of the environment enables accurate localization even in a changing environment.

Also, in a thesis entitled "Leveraging Experience for Large-Scale LIDAR Localization in Changing Cities (Proc. IEEE Int. Conf. Robot. Autom., 2015.)" written by W. Maddern, G. Pascoe and P. Newman, a localization technology using multiple prior maps obtained by repeatedly driving the same environment based on experience-based approach has been proposed.

However, the proposed methods in the above theses do not consider an optical unusual environment, for example, an environment where glass or several mirrors exist.

There are some studies that directly addressed the localization problem in the optical unusual environment. In a thesis entitled "Improved laser-based navigation for mobile robots (Proc. Int. Conf. Adv. Robot., 2009.)" written by M. Awais, a model for predicting the type of the measurement distance in the direction of a glass wall by using reflection intensity of the laser rangefinder has been proposed. However, the reflection intensity of the laser rangefinder may be affected by various factors including those proposed by the thesis of M. Awais, and thus it is inappropriate to perform analysis on only one factor Also, in a thesis entitled "Global localization of a mobile robot with laser range scanner in the outdoor environment (Proc. Int. Conf. Adv. Mechatron. Syst., 2012.)" written by Tanaka and Kochi, an observation model that can stochastically reduce the influence of the measurement error on the glass wall has been proposed. However, the measurement distance for the glass wall is not utilized.

In the meantime, in a thesis entitled "Localization of a Mobile Robot Using a Laser Range Finder in a Glass-Walled Environment (*IEEE Trans. Ind. Electron.*, vol. 63, no. 6, pp. 3616-3627, 2016.)" written by the present applicant, localization using type estimation of the measurement distance in the environment having the glass wall has been proposed. However, in the thesis, a static environment was assumed. That is, problems that may occur in the environment where a dynamic obstacle exists or the position of a static obstacle changes are not considered. Also, the performance is degraded in a particular environment where the type estimation is obscure due to the geometric characteristics.

The foregoing is intended merely to aid in the understanding of the background of the present invention, and is not intended to mean that the present invention falls within the purview of the related art that is already known to those skilled in the art.

DISCLOSURE OF THE INVENTION

Technical Problem

Accordingly, the present invention has been made keeping in mind the above problems occurring in the related art, and the present invention is intended to propose a method of estimating reliability of a measurement distance of a laser rangefinder, and localization method of a mobile robot using the laser rangefinder, the method being capable of estimating a distance type of a measurement distance measured by a laser rangefinder, and estimating reliability of the measurement distance to utilize the reliability in localization of a mobile robot.

Also, the present invention is intended to minimize performance degradation that may occur in various environmental conditions by simultaneously considering a dynamic obstacle environment, static changes in the environment, an optical unusual environment, etc., in estimating reliability of the measurement distance.

Technical Solution

The above purpose can be achieved by a method of estimating reliability of a measurement distance of a laser rangefinder, the method comprising: (a) extracting several preliminary samples based on a predicted pose; (b) calculating a reference distance set for each of the preliminary samples by applying the preliminary samples to a pre-registered reference distance calculation algorithm, the reference distance set being composed of reference distances for several distance types; (c) estimating a distance type corresponding to a reference distance having a minimum value, among distance errors between the reference distances composing the reference distance set and a measurement distance, as a distance type for the reference distance set; (d) estimating a most frequently estimated distance type, among distance types estimated for each reference distance set, as an estimation distance type of the measurement distance; and (e) calculating a first reliability weighting to which an estimated number of times as the estimation distance type among the distance types estimated for each reference distance set at step (c) is applied, and calculating a second reliability weighting to which a deviation between the measurement distance and a reference distance corresponding to the estimation distance type of a reference distance set estimated as the estimation distance type at step (c) is applied.

Herein, the first reliability weighting is calculated by formula $$w_i^1 = \begin{cases} 1, & \text{if } (v_i \geq b_v) \\ \exp\left(\dfrac{-(v_i - b_v)^2}{2\sigma_v^2}\right), & \text{if } (v_i < b_v) \end{cases}$$

(here, $w_i^1$ is the first reliability weighting for an i-th measurement distance, $v_i$ is a voting rate as the estimation distance type among the distance types estimated for each reference distance set at step (c) which is calculated by formula $$v_i = \dfrac{V_{c_i}}{\sum_{c \in C} V_c}$$

(Here, $V_{c_i}$ is the estimated number of times as the estimation distance type, and $$\sum_{c \in C} V_c$$

is a total estimated number of times for each reference distance set at step (c)), $\sigma_v$ is a standard deviation of $v_i$, and $b_v$ is a bias that is used to saturate a Gaussian function).

Also, the second reliability weighting is calculated by formula $$w_i^2 = \begin{cases} 1, & \text{if } (e_i \leq b_e) \\ \exp\left(\dfrac{-(e_i - b_e)^2}{2\sigma_e^2}\right), & \text{if } (e_i > b_e) \end{cases}$$

(here, $w_i^2$ is the second reliability weighting for an i-th measurement distance, $e_i$ is the deviation between the measurement distance and a reference distance corresponding to the estimation distance type of a reference distance set estimated as the estimation distance type at step (c), $\sigma_e$ is a standard deviation of $e_i$, and $b_e$ is a bias that is used to saturate a Gaussian function).

Also, at step (a), the predicted pose is calculated based on a pose estimated at a previous step and an odometry measurement value.

Also, at step (a), the preliminary sample is extracted as a sigma point of uncertainty distribution of the predicted pose.

Also, the sigma point of the uncertainty distribution is extracted as a point on a standard deviation in a preset range based on an average value of MCL (Monte Carlo localization) sample poses.

Further, the reference distance calculation algorithm includes a ray tracing algorithm, and at step (b), a pose of the preliminary sample and a pre-registered grid map are applied to the ray tracing algorithm, and, reference distances corresponding to a diffuse reflection distance, a penetration distance, and a specular reflection distance at the pose of the preliminary sample are calculated based on the grid map.

Also, step (c) includes: calculating distance errors between the reference distances composing the reference distance set and the measurement distance; and estimating a distance type having a smallest distance error among the calculated distance errors as the distance type for the reference distance set.

Meanwhile, the above purpose can be achieved by a localization method of a mobile robot by using a laser rangefinder, the method comprising: calculating a predicted pose of the mobile robot at a current step; estimating several measurement distances through scanning of the laser rangefinder at the current step; applying, each of the measurement distances to the method of estimating reliability of the measurement distance of the laser rangefinder so as to estimate an estimation distance type for each of the measurement distances and calculate a first reliability weighting and a second reliability weighting; applying the several measurement distances to a scan matching method and applying a reference distance corresponding to the estimation distance type, the first reliability weighting, and the second reliability weighting to a reference distance of the scan matching method; and estimating a pose of the mobile robot based on a scan matching error caused by the scan matching method.

Herein, the scan matching error is a scan matching error of an MCL (Monte Carlo localization) sample, and the scan matching error is calculated by formula $$E^n = \frac{\sum_i |(z_i^n w_i)^2 \Delta \gamma - (z_i w_i)^2 \Delta \gamma|}{\sum_i ((z_i^n w_i)^2 \Delta \gamma + (z_i w_i)^2 \Delta \gamma)}$$

(here, $E^n$ is the scan matching error of a n-th MCL (Monte Carlo localization) sample, $z_i^n$ is a reference distance corresponding to the estimation distance type for a measurement distance at an i-th scanning of the n-th MCL (Monte Carlo localization) sample, $W_i$ is a final reliability weighting at i-th scanning which is calculated based on the first reliability weighting and the second reliability weighting, and $\Delta \gamma$ is an angular resolution of the laser rangefinder).

Also, the final reliability weighting is calculated by formula $$w_i = \begin{cases} w_i', & \text{if } (w_i' \geq w_m) \\ 0, & \text{if } (w_i' < w_m) \end{cases}$$

(here, $W_i'$ is a product of the first reliability weighting and the second reliability weighting for the measurement distance at the i-th scanning, and $W_m$ is a median of $W_i'$ calculated for every measurement distance).

Advantageous Effect

According to the present invention, a method of estimating reliability of a measurement distance of a laser rangefinder, and a localization method of a mobile robot using the laser rangefinder is provided which can estimate a distance type of a measurement distance measured by a laser rangefinder, and estimate reliability of the measurement distance to utilize the reliability in localization of a mobile robot.

Also, the present invention can minimize performance degradation that may occur in various environmental conditions by simultaneously considering a dynamic obstacle environment, static changes in the environment, an optical unusual environment, etc., in estimating reliability of the measurement distance.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinbelow, exemplary embodiments of the present invention will be described in detail with reference to the accompanying drawings.

Before explaining a method of estimating reliability of a measurement distance of a laser range finder, and a localization method of a mobile robot 100 using the laser rangefinder according to the present invention, an optical characteristic of light at a glass wall will be described.

Figure 1:
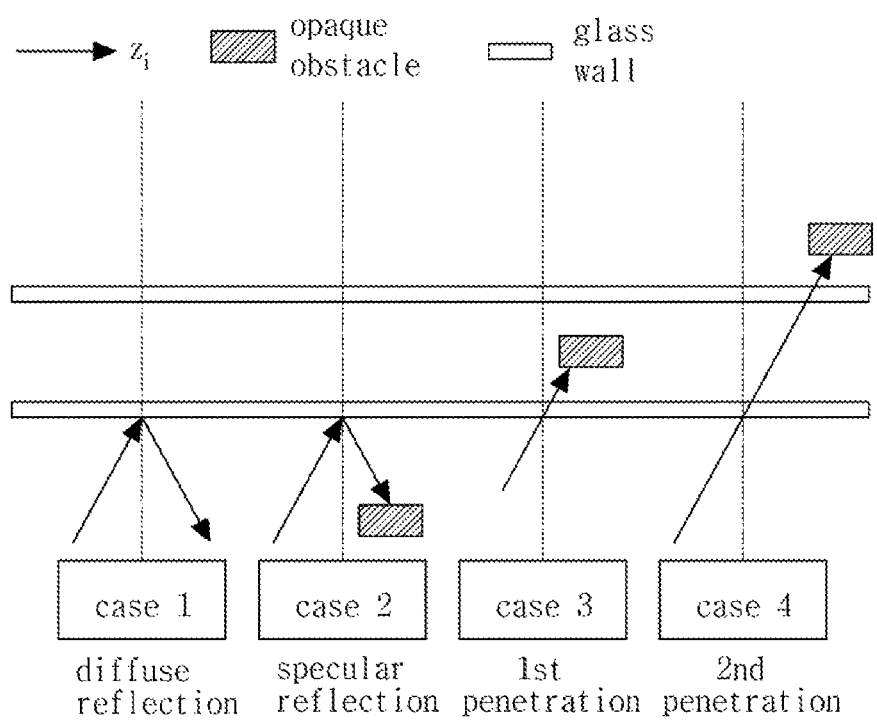
FIG. 1 is a view illustrating an optical characteristic of a laser beam at a glass wall.

The laser rangefinder is one of optical sensors that follow the characteristics of light. Therefore, a progress direction of a laser beam emitted from the laser rangefinder and changed after reaching a glass wall is closely related to the characteristics of light. FIG. 1 illustrates all paths that may occur when light reaches a glass wall.

$z_i$ is a measurement distance measured by the i-th scanning of the laser rangefinder. In the present invention, as shown in FIG. 1, it is assumed that $z_i$ is measured as a one result of four distance types. In FIG. 1, case 1 and case 2 are respectively defined as diffuse reflection and specular reflection. Considering multiple penetration, namely, a double glass wall, case 3 and case 4 are respectively defined as the first penetration and the second penetration.

Here, the number of the types corresponding to penetration may be set different depending on the characteristics of the environment. In FIG. 1, the measurement distance for the glass wall is shown as an example, but all types may occur for an object other than the glass wall.

For example, specular reflection may occur on a mirror or a smooth wall, and when an obstacle existing on a map, namely, a grid map actually disappear, penetration may be considered to have occurred. The present invention also considers these environmental changes, whereas the above-described thesis "Localization of a Mobile Robot Using a Laser Range Finder in a Glass-Walled Environment (*IEEE Trans. Ind. Electron.*, vol. 63, no. 6, pp. 3616-3627, 2016.)" (hereinafter, referred to as 'the thesis') does not, and detailed description thereof will be described later.

In the meantime, distance types shown in FIG. 1 are predictable by comparing the measurement distance of the laser rangefinder with the distances calculated from the grid map. In contrast, FIGS. 2A to 2C are views illustrating examples of measurement distances that are difficult to be predicted through the grid map.

Figure 2A:
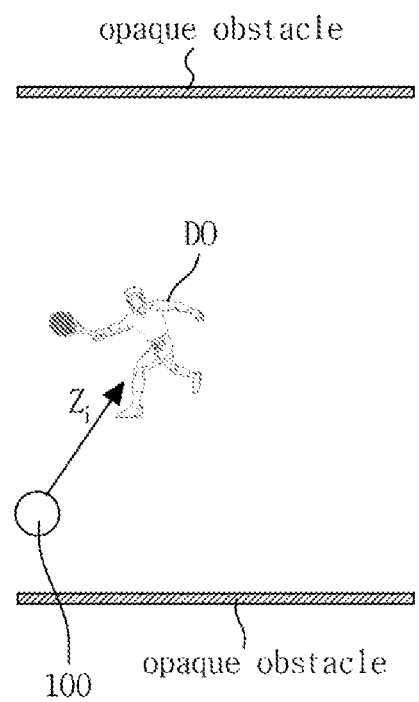
FIGS. 2A to 2C are views illustrating examples of measurement distances that are difficult to be predicted through a grid map.
Figure 2B:
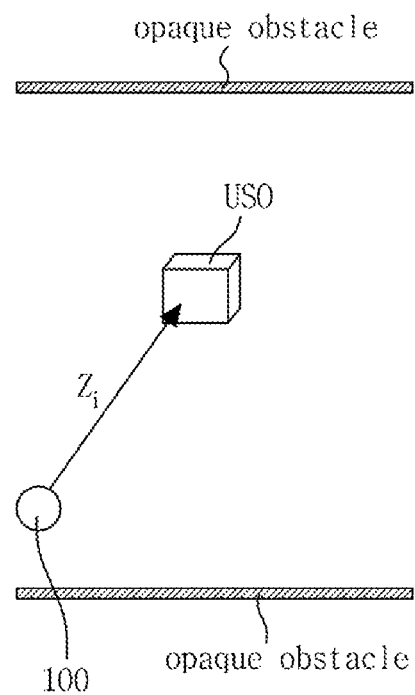
Figure 2C:
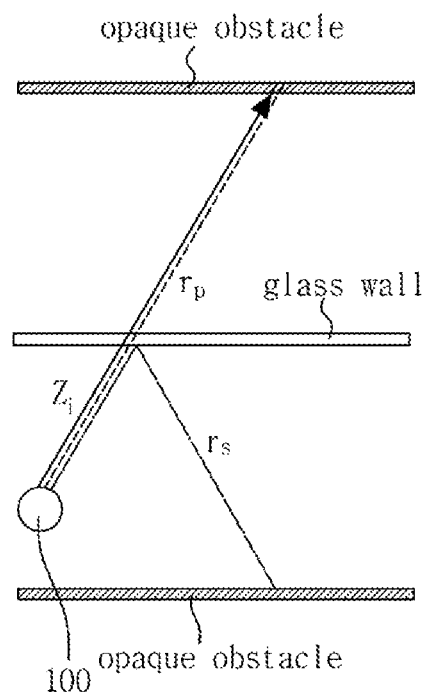

FIGS. 2A and 2B illustrate measurement distances by a dynamic obstacle (DO) and a newly arranged static obstacle (USO). Since two obstacles are unknown on the grip map, it is difficult to predict a distance type through the grid map. Also, FIG. 2C illustrates a measurement distance of which a distance type is difficult to be estimated due to a geometrical structure of the environment. That is, in FIG. 2C, since a specular reflection distance $r_s$ is similar to a penetration distance $r_p$ that is calculated from the grid map, it is difficult to predict whether the measurement distance $z_i$ is the specular reflection distance or the penetration distance. The case of the measurement distance of which the distance type is difficult to be precisely predicted is excluded from estimation of the distance type in the thesis, but is considered in the present invention, and a detailed description thereof will be described later.

Hereinafter, a method of estimating reliability of a measurement distance of a laser rangefinder according to the present invention will be described in detail with reference to FIG. 3.

First, when a measurement distance at the current step is measured through scanning of the laser rangefinder, the measurement distance and predicted pose are input at step S10. Here, a grid map which is map information related to a movement environment of the mobile robot 100 is registered in the mobile robot 100, and the grid map is applied in a process of calculating a reference distance set described later.

Also, the predicted pose is an approximate pose of the mobile robot 100 at the current step, and may be calculated based on the pose of the mobile robot 100 estimated at the previous step and an odometry measurement value at the current step.

Figure 3:
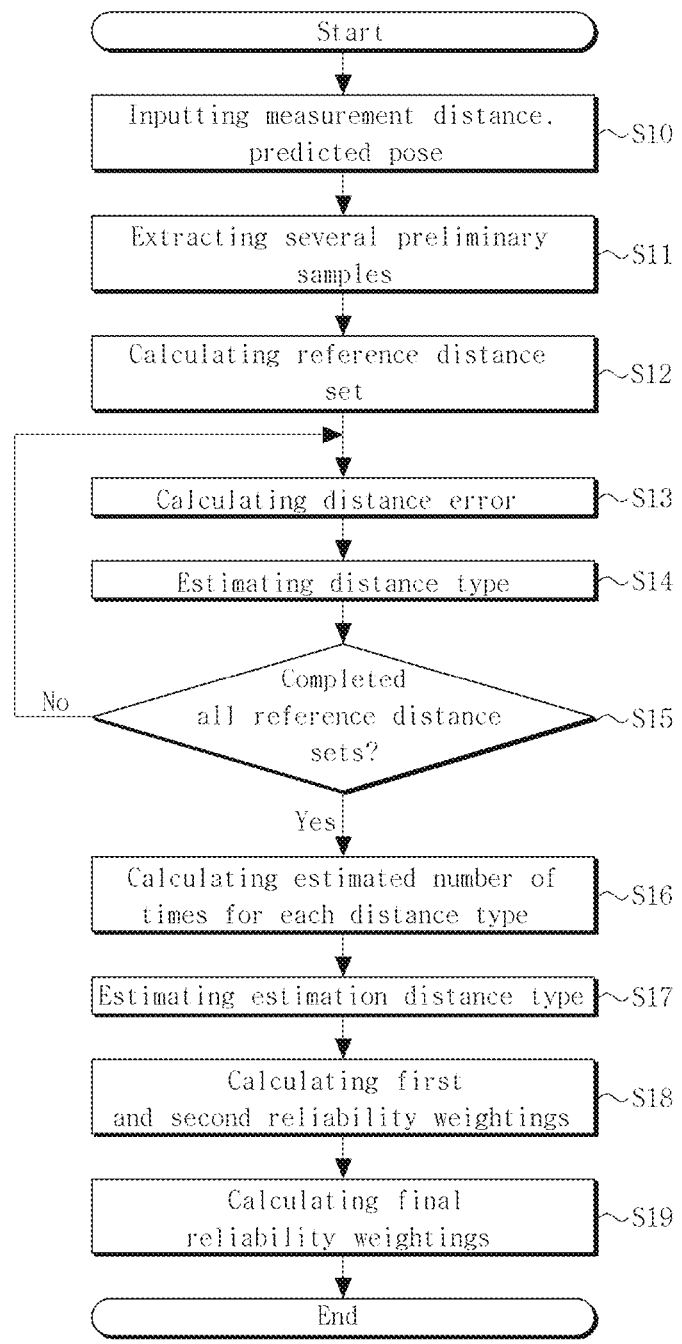
FIG. 3 is a view illustrating a method of estimating reliability of a measurement distance of a laser rangefinder according to the present invention.

Here, the type estimation process shown in FIG. 3 is an estimation process of the distance type for the measurement distance measured in a particular direction, i.e., a particular angle in the scanning process of the laser rangefinder. The distance type estimation and reliability estimation processes shown in FIG. 3 are performed for each scanning angle of the laser rangefinder. For example, when the measurement distance is $z_i$ as described above, it means a measurement distance measured at the i-th (angle) scanning.

Referring to FIG. 3 again, when the measurement distance and the predicted pose are input at step S10, several preliminary samples are extracted based on the predicted pose at the current location at step S11. Here, in the present invention, the preliminary sample is extracted as a sigma point of uncertainty distribution of the predicted pose. Here, the sigma point of uncertainty distribution is extracted as a point on the standard deviation in a preset range based on an average value of MCL (Monte Carlo localization) sample poses.

More specifically, uncertainty distribution of the pose of the mobile robot 100 may be indicated by MCL samples. The pose of preliminary samples extracted at time t may be indicated as [Formula 1].

$$p_t^{j,k,l} = \{p_{x,t}^{j,k,l}, p_{y,t}^{j,k,l}, p_{\theta,t}^{j,k,l}\} \qquad \text{[Formula 1]}$$

In [Formula 1], the pose of preliminary samples is designated by $p_t^{j,k,l}$, and factors indicate an X-axis value, a Y-axis value, and θ value of each preliminary sample. Also, each factor of [Formula 1] is calculated through [Formula 2].

$$p_{x,t}^{j,k,l} = \bar{s}_{x,t} + \sigma_{x,t} \times j,$$

$$p_{y,t}^{j,k,l} = \bar{s}_{y,t} + \sigma_{y,t} \times k,$$

$$p_{\theta,t}^{j,k,l} = \bar{s}_{\theta,t} + \sigma_{\theta,t} \times l,$$

$$j,k,l \in \{-1,0,1\} \qquad \text{[Formula 2]}$$

Figure 4:
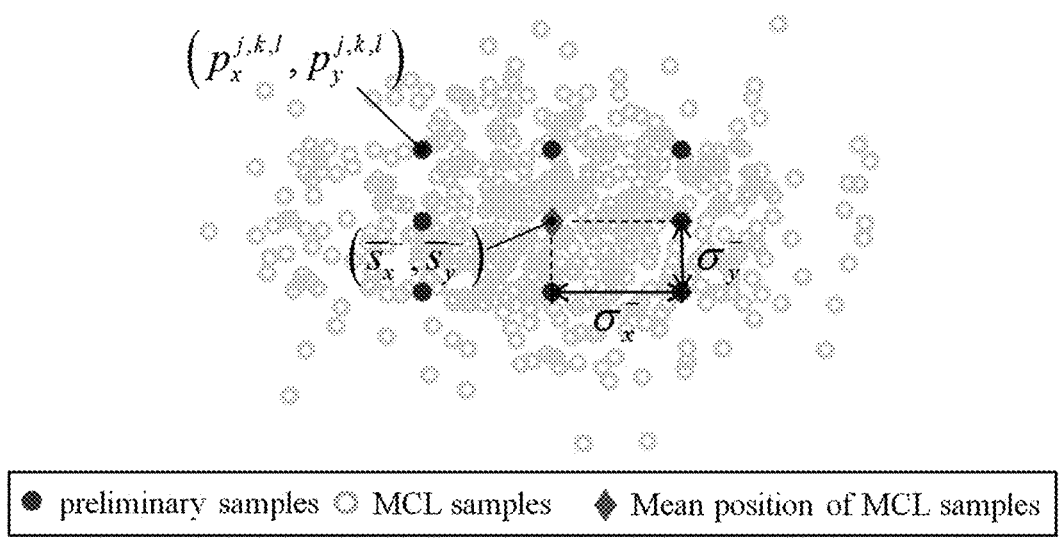
FIG. 4 is a view illustrating, in the method of estimating reliability of a measurement distance, an example of extracting preliminary samples through MCL samples according to the present invention.

In [Formula 2], the average pose and the standard deviation of the MCL samples are respectively designated by $\bar{s}_{t} = \{\bar{s}_{x,t}, \bar{s}_{y,t}, \bar{s}_{\theta,t}\}$ and $\sigma_t = \{\sigma_{x,t}, \sigma_{y,t}, \sigma_{\theta,t}\}$. FIG. 4 is a view illustrating an example of extracting preliminary samples through MCL samples. With respect to the average pose of MCL samples, points on the standard deviation in a preset range, i.e., j, k, l={-1, 0, 1} are extracted as preliminary samples.

Accordingly, it is possible to actively cope with the pose estimation state. That is, uncertainty distribution of the pose of MCL sample is considered, namely, the standard deviation of the current distribution is used. Thus, when uncertainty of the pose of the current mobile robot 100 is large, preliminary samples are extracted at wide intervals. When uncertainty is small, preliminary samples are extracted at narrow intervals such that it is possible to actively cope with the pose estimation state.

Referring to FIG. 3 again, after several preliminary samples are extracted at step S11, a reference distance set for each preliminary sample is calculated at step S12. Here, the preliminary sample is applied to the pre-registered reference distance calculation algorithm, and a reference distance set for each preliminary sample is calculated. Here, the reference distance set is composed of reference distances for several distance types. In the present invention, as shown in FIG. 1, the reference distance set is composed of reference distances for four distance types, such as a diffuse reflection distance (case 1), a specular reflection distance (case 2), the first penetration distance (case 3), and the second penetration distance (case 4).

In the method of estimating reliability of the distance type according to the present invention, a ray tracing algorithm is applied as a reference distance calculation algorithm. Also, the pose of the preliminary sample and the pre-registered grid map is applied to the ray tracing algorithm such that several reference distances corresponding to the diffuse reflection distance, the specular reflection distance, and two penetration distances are calculated.

Generally, ray tracing provides a way to locate an object that is first encountered when a laser beam is emitted at a particular location and angle. Therefore, a reference distance calculated by the existing ray tracing algorithm corresponds to the diffuse reflection distance.

In the present invention, by using the pose of the preliminary sample and the grid map, the ray tracing is transformed so as to calculate a reference distance corresponding to the specular reflection distance and reference distances corresponding to the first and second penetration distances.

For example, in the case of the reference distance corresponding to the specular reflection distance, at the point where the laser beam first meets an obstacle, the beam progresses changing the direction to the reflection angle equal to the incident angle for the obstacle, and when the beam meets an obstacle again, the total travel distance of the beam is calculated.

Similarly, in the case of the reference distance corresponding to the penetration distance, at the point where the laser beam first meets an obstacle, the beam progresses without changing the direction, and when the beam meets an obstacle again, the total travel distance of the beam is calculated. The reference distance corresponding to the second penetration distance may be calculated in the same manner.

Through the above process, when reference distance sets for each preliminary sample are calculated, each reference distance set is compared with the measurement distance at step S13 and the distance type for each reference distance set is estimated at step S14.

More specifically, first, distance errors between several reference distances composing one reference distance set and the measurement distance are calculated at step S13. As described above, errors between four reference distances and the measurement distance are calculated, and thus four distance errors for one reference distance set are calculated.

Also, among four distance errors of one reference distance set, the distance type corresponding to the reference distance having the minimum value is estimated as the distance type for the reference distance set at step S14.

Through the above process, when estimation of the distance type for one reference distance set is complete, distance types for all reference distance sets are estimated through steps S13 to S15.

When distance types of all reference distance sets for one measurement distance are estimated, the estimated number of times for each distance type is calculated at step S16. Also, among distance types estimated for each reference distance set, the most frequently estimated distance type is determined as the distance type of the measurement distance (hereinafter, referred to as 'an estimation distance type') at step S17, namely, the estimation distance type of the measurement distance.

That is, in the thesis, the case shown in FIG. 2C is regarded as a failure of estimation of the distance type, and the measurement distance is excluded from the pose estimation of the mobile robot 100. In contrast, in the present invention, among the distance types estimated for the reference distance set, the most frequently estimated distance type is determined as the estimation distance type of the measurement distance. A weighting is assigned to the estimation distance type through reliability estimation, such that more accurate localization is possible in various driving environments. Hereinafter, reliability estimation will be described in detail.

In the present invention, reliability of each measurement distance is estimated through calculation of the first reliability weighting and the second reliability weighting at step S18. Here, the estimated number of times as the estimation distance type among the distance types estimated for each reference distance set at step S14 is applied to the first reliability weighting.

In the present invention, the first reliability weighting is calculated by [Formula 3].

$$w_i^1 = \begin{cases} 1, & \text{if } (v_i \geq b_v) \\ \exp\left(\frac{-(v_i - b_v)^2}{2\sigma_v^2}\right), & \text{if } (v_i < b_v) \end{cases} \quad \text{[Formula 3]}$$

Here, $w_i^1$ is the first reliability weighting for an i-th measurement distance, $v_i$ is a voting rate as the estimation distance type among the distance types estimated for each reference distance set at step S14. $v_i$ is calculated by formula $$v_i = \frac{V_{c_i}}{\sum_{c \in C} V_c}.$$

Here, $V_{c_i}$ is the estimated number of times as the estimation distance type, and $$\sum_{c \in C} V_c$$

is a total estimated number of times for each reference distance set at step S14. Also, $\sigma_v$ is a standard deviation of $v_i$, and $b_v$ is a bias that is used to saturate a Gaussian function.

Figure 5A:
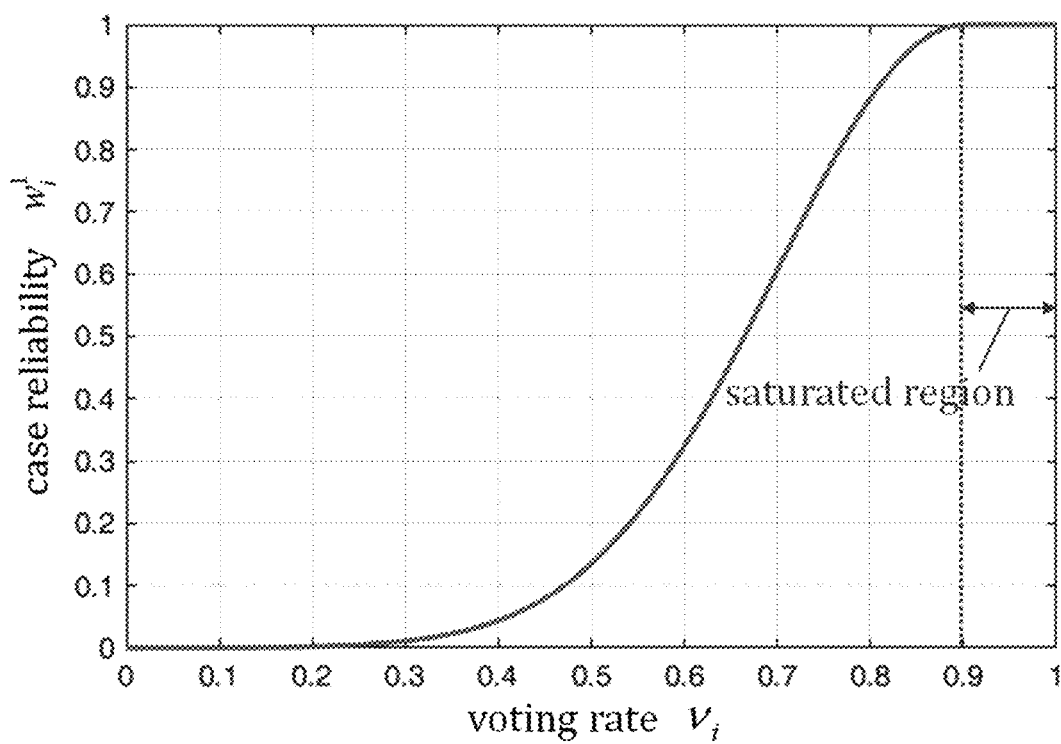
FIG. 5A is a view illustrating a relationship between a first reliability weighting and a voting rate according to the present invention.

FIG. 5A is a view illustrating a relationship between the first reliability weighting $w_i^1$ and the voting rate according to the present invention. In FIG. 5A, $\sigma_v$ and $b_v$ are set to 0.2 and 0.9, respectively, as one example.

Referring to FIG. 5A, the method of estimating reliability of the distance type according to the present invention gives the high first reliability weighting $w_i^1$ with respect to the measurement distance in which the voting rate $v_i$ is high. In other words, if $v_i$ is low, then the distance type which is estimated is considered less reliable. In addition, $w_i^1$ is computed under the consideration of the standard deviation $\sigma_v$ of $v_i$ for all measurement distances. When the standard deviation $\sigma_v$ of $v_i$ is small, $w_i^1$ is greatly reduced even if $v_i$ is slightly reduced.

Meanwhile, $v_i$ has some degree of uncertainty because $v_i$ is computed on the basis of the prior distribution of the robot pose. Thus, in order to ensure that $w_i^1$ is not excessively sensitive to $v_i$, the method according to the present invention uses the saturated Gaussian function not the basic Gaussian function.

In the meantime, the deviation between the measurement distance and the reference distance that is the estimation distance type of the reference distance set estimated as the estimation distance type is applied to the second reliability weighting. More specifically, the deviation between the measurement distance and the mean of the reference distances is applied to the second reliability weighting. Here, the mean of the reference distances is mean of the reference distances of the estimation distance type among reference distances of the reference distance set which is estimated as the estimation distance type at step S14.

In the present invention, the second reliability weighting is calculated by [Formula 4].

$$w_i^2 = \begin{cases} 1, & \text{if } (e_i \leq b_e) \\ \exp\left(\dfrac{-(e_i - b_e)^2}{2\sigma_e^2}\right), & \text{if } (e_i > b_e) \end{cases} \quad \text{[Formula 4]}$$

Here, $w^2_i$ is the second reliability weighting for an i-th measurement distance, $e_i$ is the deviation between the measurement distance and a reference distance corresponding to the estimation distance type of a reference distance set estimated as the estimation distance type at step S14, $\sigma_e$ is a standard deviation of $e_i$, and $b_e$ is a bias that is used to saturate a Gaussian function.

Here, $e_i$ is calculated by [Formula 5].

$$e_i = |z_i - \bar{r}| \quad \text{[Formula 5]}$$

In [Formula 5], $z_i$ is the measurement distance and $\bar{r}$ is the mean of the reference distances.

Figure 5B:
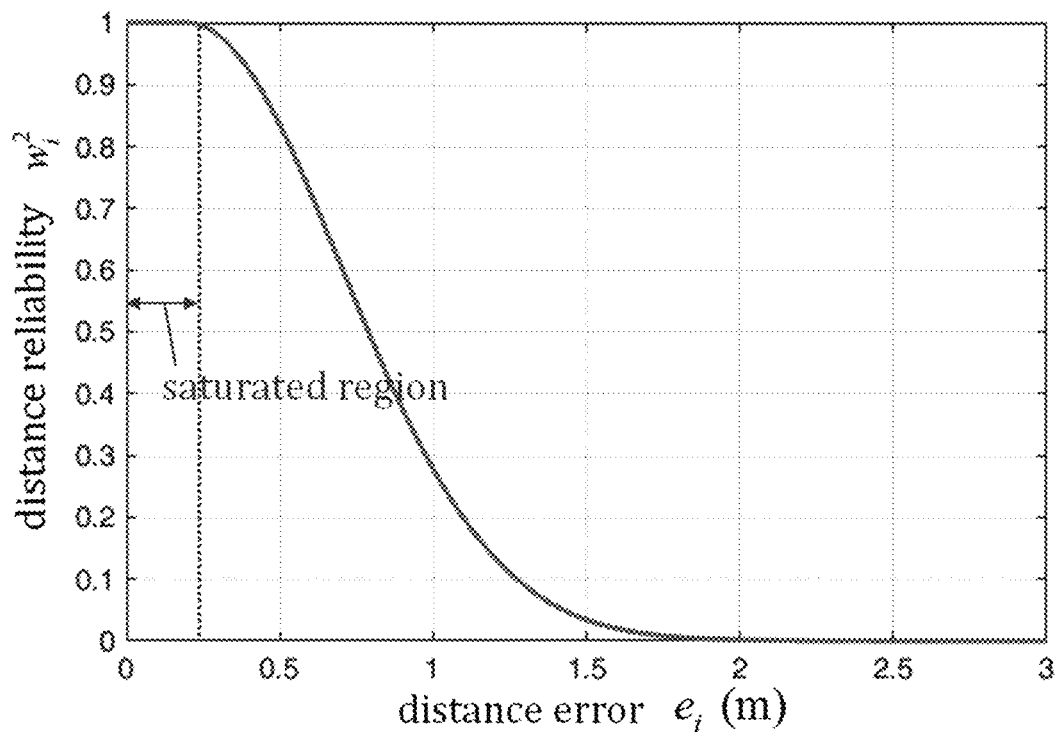
FIG. 5B is a view illustrating a relationship between a second reliability weighting and the distance error according to the present invention.

FIG. 5B is a view illustrating a relationship between the second reliability weighting $w^2_i$ and the deviation $e_i$ according to the present invention. In FIG. 5B, $\sigma_e$ and $b_e$ are set to 0.5 and 0.2, respectively, as one example. When the measurement distance is affected by dynamic obstacles or unknown static obstacles, $w^2_i$ becomes low.

Meanwhile, in the present invention, a final reliability weighting can be calculated at step S19, as shown in FIG. 3. The final reliability weighting is calculated based on the first reliability weighting and the second reliability weighting, as one example, is calculated by [Formula 6].

$$w_i = \begin{cases} w_i', & \text{if } (w_i' \geq w_m) \\ 0, & \text{if } (w_i' < w_m) \end{cases} \quad \text{[Formula 6]}$$

Here, $W_i$ is the final reliability weighting, $W_i'$ is a product of the first reliability weighting and the second reliability weighting for the measurement distance at the i-th scanning, and $W_m$ is a median of $W_i'$ calculated for every measurement distance. If $W_i$ is below $W_m$, then the final reliability weighting $W_i$ becomes 0. As a result, only reliable measurement distances are applied to localization which is described later.

Figure 6:
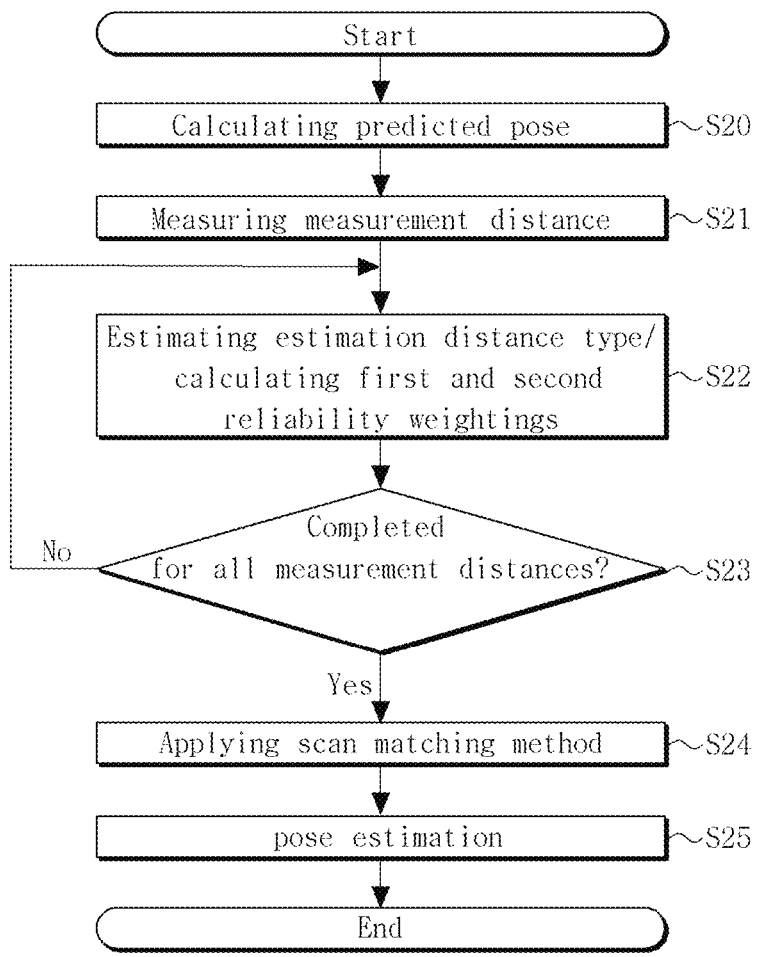
FIG. 6 is a view illustrating a localization method of a mobile robot according to the present invention.

Hereinafter, a localization method of the mobile robot 100 according to the present invention will be described in detail with reference to FIG. 6.

First, a predicted pose at the current step of the mobile robot 100 is calculated at step S20. Here, the predicted pose is, as described above, an approximate pose of the mobile robot 100 at the current step, and is calculated based on the pose of the mobile robot 100 estimated at the previous step and an odometry measurement value at the current step.

Next, several measurement distances for each direction are measured by scanning of the laser rangefinder of the mobile robot 100 at step S21. The distance type for one measurement distance, namely, the estimation distance type is determined, and the first reliability weighting and the second reliability weighting are calculated at step S22. Here, in estimation of the estimation distance type and calculation of the first reliability weighting and the second reliability weighting, as described above, the method of estimating reliability of the measurement distance according to the present invention is applied.

Through the above process, when estimation of the distance type for one measurement distance and calculation of the first reliability weighting and the second reliability weighting are completed at the current step, steps S22 and S23 are performed on all measurement distances and thus the distance types are estimated and the first reliability weighting and the second reliability weighting are calculated for all measurement distances.

Next, several measurement distances are applied to a scan matching method. The reference distance corresponding to the estimation distance type for the measurement distance and the first reliability weighting and the second reliability weighting are applied to the reference distance of the scan matching method at step S24.

Next, based on a scan matching error caused by the scan matching method, the pose of the mobile robot 100 is estimated at step S25. Consequently, the distance type of the measurement distance, and the first reliability weighting and the second reliability weighting, which are estimated reliability for the measurement distance, are applied, and thus more accurate localization is completed.

Hereinafter, an example of estimating the pose of the mobile robot 100 by using Monte Carlo localization will be described.

Monte Carlo localization is fundamentally based on a Bayes filtering algorithm, and is classified into three steps of prediction, measurement update, and re-sampling.

First, at the prediction step, by using each MCL (Monte Carlo localization) sample pose at the previous step and the odometry measurement value at the current step, $\overline{\text{bel}}(X_{n,t})$ which is belief of each MCL sample pose before including the observation result at the current step is calculated by [Formula 7].

$$\overline{\text{bel}}(X_{n,t}) = \int p(X_{n,t}|u_t, X_{n,t-1})\text{bel}(X_{n,t-1})dX_{t-1},$$
$$1 \leq n \leq N \quad \text{[Formula 7]}$$

Here, N is the number of MCL samples, and a motion model is $p(X_{n,t}|u_t, X_{n,t-1})$. In the present invention, as an example of the motion model, an odometry motion model is applied.

At a measurement update step, by using the observation result of the current step and grid map information, $\text{bel}(X_{n,t})$ which is belief of each MCL sample pose at the current step is calculated by [Formula 8].

$$\text{bel}(X_{n,t}) = \eta p(Z_t|X_{n,t}, M)\overline{\text{bel}}(X_{n,t}) \quad \text{[Formula 8]}$$

Here, a normalizing constant is designated by $\eta$, and an observation model is $p(Z_t|X_{n,t}, m)$. In the present invention, as the observation model, probability distribution depending on the scan matching error using the area difference is used. The scan matching method shown in FIGS. 7A and 7B is applied in calculation of a matching error using the area difference, and the reference distance to which the distance type of the measurement distance and reliability estimation are applied is used.

Here, according to the present invention, estimation of the estimation distance type of the measurement distance and calculation of the first reliability weighting and the second reliability weighting are performed before the measurement update step, and are applied in calculation of the scan matching error being applied in the measurement update step.

More specifically, when the method of estimating reliability of the measurement distance according to the present invention is completed, likelihood of all MCL samples used in Monte Carlo localization is updated by the observation model.

Figure 7A:
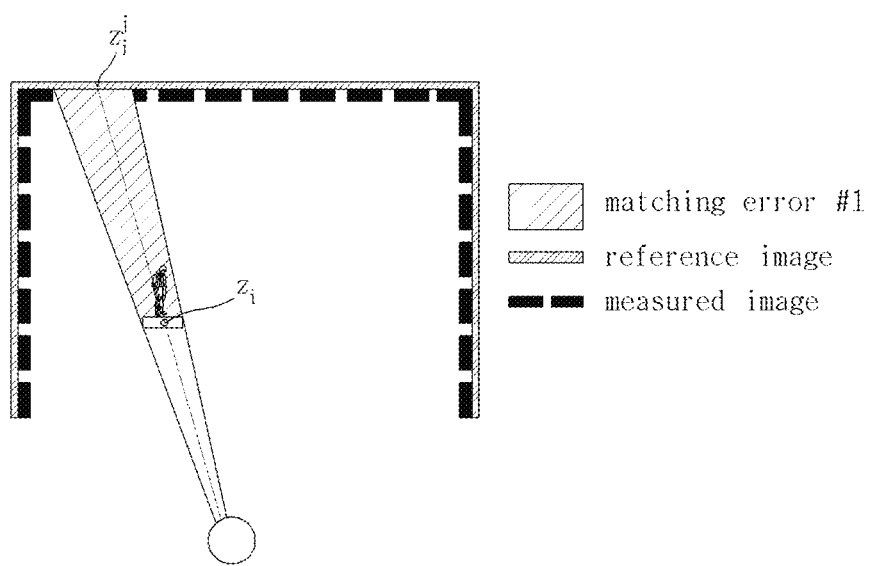
FIGS. 7A and 7B are views illustrating a matching error using an area difference.
Figure 7B:
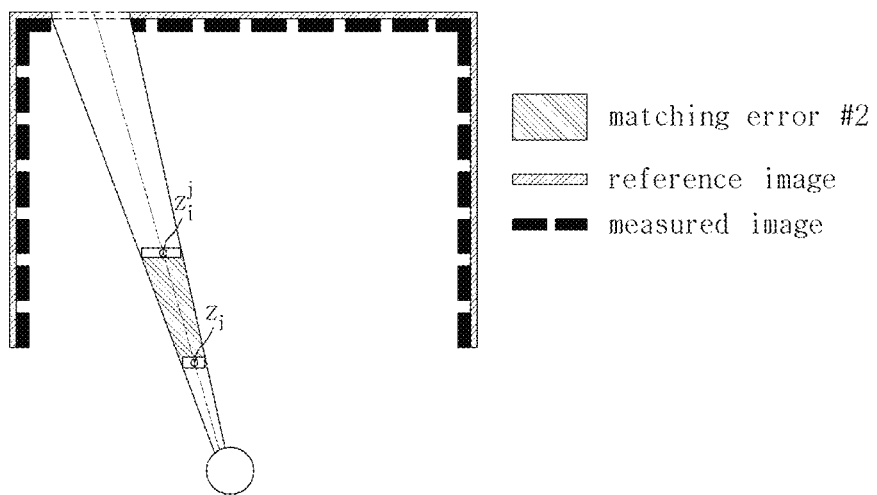

FIGS. 7A and 7B are views illustrating a scan matching error using an area difference. As described above, in the present invention, as the observation model, probability distribution depending on the matching error using the area difference is used. The scan matching error is calculated using the area difference of the image expressed by the scan image of the laser rangefinder, i.e., the measurement distance, and the reference distance calculated from the grid map. Here, the scan matching error is calculated by [Formula 9].

$$E^n = \frac{\sum_i |(z_i^n w_i)^2 \Delta\gamma - (z_i w_i)^2 \Delta\gamma|}{\sum_i ((z_i^n w_i)^2 \Delta\gamma + (z_i w_i)^2 \Delta\gamma)}$$ [Formula 9]

In [Formula 9], $E^n$ is the scan matching error of a n-th MCL (Monte Carlo localization) sample, $z^n_i$ is a reference distance corresponding to the estimation distance type for a measurement distance at an i-th scanning of the n-th MCL (Monte Carlo localization) sample, $W_i$ is the final reliability weighting at i-th scanning, and $\Delta\gamma$ is an angular resolution of the laser rangefinder.

FIG. 7A is a view illustrating a scan matching error applied in an existing method, and FIG. 7B is a view illustrating a scan matching error to which the estimation distance type, the first reliability weighting, and second reliability weighting are applied, in the method of estimating reliability of the measurement distance according to the present invention.

Referring to FIGS. 7A and 7B, assuming that the reliability weighting $w_{i,t}$ of the measurement distance measured in the direction of the dynamic obstacle is calculated to be 0.5, in localization according to the present invention, the scan matching error for the portion where the distance error occurs due to the dynamic obstacle is calculated to be small.

Through the above process, when calculation of the scan matching error for all MCL sample poses is completed, likelihood of all MCL samples is updated using Gaussian probability distribution depending on the matching error.

When the measurement update process is completed, all new MCL samples are obtained based on bel($X_{n,t}$) calculated at the measurement update process. That is, through re-sampling, MCL samples having low weightings are replaced by MCL samples having high weightings, and after re-sampling process on all MCL samples, bel($X_{n,t}$) of all MCL sample poses are changed to be the same value.

In the above process, the pose at the current step of the mobile robot 100 is estimated through a matching error for each MCL sample calculated at the measurement update process. Here, various known methods may be applied in localization of the mobile robot 100 through the matching error. For example, the MCL sample pose having the lowest matching error is estimated as the pose of the mobile robot 100, or the pose of the mobile robot 100 may be estimated based on a weighted average of all MCL sample poses.

In the embodiment, Monte Carlo localization is applied as the localization method according to the present invention. Also, localization to which a sensor model using a scan matching method of the laser rangefinder is applied, such as localization using the Kalman filter, the extended Kalman filter, the unscented Kalman filter, etc., may be used.

Also, in the above embodiment, the matching error using the area difference is applied in the scan matching method, but other methods using the distance difference between the reference distance and the measurement distance are also possible.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A processor-implemented method of estimating reliability of a distance of a mobile object for localizing the mobile object, the method comprising:
   measuring, by one or more processors, the distance of the mobile object using a rangefinder sensor;
   extracting, by the one or more processors, several preliminary samples based on a predicted pose;
   determining, by the one or more processors, a reference distance set for each of the preliminary samples by applying the preliminary samples to a pre-registered reference distance determination algorithm, the reference distance set being composed of reference distances for several distance types;
   estimating, by the one or more processors, a distance type corresponding to a reference distance having a minimum value, among distance errors between the reference distances composing the reference distance set and a measurement distance, as a distance type for the reference distance set;
   estimating, by the one or more processors, a most frequently estimated distance type, among distance types estimated for each reference distance set, as an estimation distance type of the measured distance;
   determining, by the one or more processors, a first reliability weighting to which an estimated number of times as the estimation distance type among the distance types estimated for each reference distance set is applied;
   determining, by the one or more processors, a second reliability weighting to which a deviation between the measurement distance and a reference distance corresponding to the estimation distance type of a reference distance set estimated as the estimation distance type is applied; and
   performing, by the one or more processors, a control processing of localizing the mobile object based on a determined final reliability of the measured distance, the determined final reliability being determined from the first reliability weighting and the second reliability weighting.

2. The method of claim 1, wherein the first reliability weighting is determined by formula $$w_i^1 = \begin{cases} 1, & \text{if } (v_i \geq b_v) \\ \exp\left(\frac{-(v_i - b_v)^2}{2\sigma_v^2}\right), & \text{if } (v_i < b_v) \end{cases}$$

(here, $w^1_i$ is the first reliability weighting for an i-th measurement distance, $v_i$ is a voting rate as the estimation distance type among the distance types estimated for each reference distance set which is calculated by formula $$v_i = \frac{V_{c_i}}{\sum_{c \in C} V_c}$$

(Here, $V_{c_i}$ is the estimated number of times as the estimation distance type, and $$\sum_{c \in C} V_c$$

is a total estimated number of times for each reference distance set), $\sigma_v$ is a standard deviation of $v_i$, and $b_v$ is a bias that is used to saturate a Gaussian function).

3. The method of claim 1, wherein the second reliability weighting is determined by formula $$w_i^2 = \begin{cases} 1, & \text{if } (e_i \leq b_e) \\ \exp\left(\dfrac{-(e_i - b_e)^2}{2\sigma_e^2}\right), & \text{if } (e_i > b_e) \end{cases}$$

(here, $w_i^2$ is the second reliability weighting for an i-th measurement distance, $e_i$ is the deviation between the measurement distance and a reference distance corresponding to the estimation distance type of a reference distance set estimated as the estimation distance type $\sigma_e$ is a standard deviation of $e_i$, and $b_e$ is a bias that is used to saturate a Gaussian function).

4. The method of claim 1, wherein the predicted pose is determined based on a pose estimated at a previous step and an odometry measurement value.

5. The method of claim 1, wherein the preliminary sample is extracted as a sigma point of uncertainty distribution of the predicted pose.

6. The method of claim 5, wherein the sigma point of the uncertainty distribution is extracted as a point on a standard deviation in a preset range based on an average value of MCL (Monte Carlo localization) sample poses.

7. The method of claim 1, wherein the reference distance determination algorithm includes a ray tracing algorithm, and
a pose of the preliminary sample and a pre-registered grid map are applied to the ray tracing algorithm, and, reference distances corresponding to a diffuse reflection distance, a penetration distance, and a specular reflection distance at the pose of the preliminary sample are determined based on the grid map.

8. The method of claim 1, wherein the estimating of the distance type includes:
determining distance errors between the reference distances composing the reference distance set and the measurement distance; and
estimating a distance type having a smallest distance error among the determined distance errors as the distance type for the reference distance set.

9. The method of claim 1, further comprising:
determining the final reliability weighting which is determined by formula $$w_i = \begin{cases} w_i', & \text{if } (w_i' \geq w_m) \\ 0, & \text{if } (w_i' < w_m) \end{cases}$$

(here, $w_i$ is the final reliability weighting at i-th scanning, $w_i'$ is a product of the first reliability weighting and the second reliability weighting for the measured distance at the i-th scanning, and $w_m$ is a median of $w_i'$ calculated for every measured distance.

10. A processor-implemented localization method of localizing a mobile robot using a laser rangefinder sensor, the method comprising:
determining a predicted initial pose of the mobile robot at a current step;
estimating several measurement distances through scanning of the laser rangefinder sensor at the current step;
applying each of the measurement distances to a method of estimating reliability of a measurement distance of the laser rangefinder sensor according to claim 1 so as to estimate an estimation distance type for each of the measurement distances and determine each of a first reliability weighting and a second reliability weighting;
applying the several measurement distances to a scan matching method and applying a reference distance corresponding to the estimation distance type, the first reliability weighting, and the second reliability weighting to a reference distance of the scan matching method;
determining a final pose of the mobile robot based on a scan matching error caused by the scan matching method; and
localizing the mobile robot based on a result of the estimating the final pose of the mobile robot.

11. The method of claim 10, wherein the scan matching error is a scan matching error of an MCL (Monte Carlo localization) sample, and
the scan matching error is determined by formula $$E^n = \dfrac{\sum\limits_{i} |(z_i^n w_i)^2 \Delta\gamma - (z_i w_i)^2 \Delta\gamma|}{\sum\limits_{i} ((z_i^n w_i)^2 \Delta\gamma + (z_i w_i)^2 \Delta\gamma)}$$

(here, $E^n$ is the scan matching error of a n-th MCL (Monte Carlo localization) sample, $z_i^n$ is a reference distance corresponding to the estimation distance type for a measurement distance at an i-th scanning of the n-th MCL (Monte Carlo localization) sample, $w_i$ is a final reliability weighting at i-th scanning which is determined based on the first reliability weighting and the second reliability weighting, and $\Delta\gamma$ is an angular resolution of the laser rangefinder).

12. The method of claim 11, wherein the final reliability weighting is determined by formula $$w_i = \begin{cases} w_i', & \text{if } (w_i' \geq w_m) \\ 0, & \text{if } (w_i' < w_m) \end{cases}$$

(here, $w_i'$ is a product of the first reliability weighting and the second reliability weighting for the measurement distance at the i-th scanning, and $w_m$ is a median of $w_i'$ calculated for every measurement distance).

* * * * *